US00RE35771E

United States Patent [19]

Giesen

[11] E Patent Number: Re. 35,771

[45] Reissued Date of Patent: Apr. 14, 1998

[54] PROCESS FOR PRODUCING A FINE PORED SILICONE FOAM

[75] Inventor: Franz Joseph Giesen, Bergheim, Germany

[73] Assignee: H. B. Fuller Licensing & Financing, Inc., Arden Hills, Minn.

[21] Appl. No.: 773,396

[22] Filed: Dec. 26, 1996

Related U.S. Patent Documents

Reissue of:

[64] Patent No.: 5,356,940
Issued: Oct. 18, 1994
Appl. No.: 141,299
Filed: Oct. 22, 1993

[30] Foreign Application Priority Data

Oct. 22, 1992 [DE] Germany ..... 42 35 693.3

[51] Int. Cl.[6] ..... C08J 9/02

[52] U.S. Cl. ..... 521/77; 521/72; 521/82; 521/154

[58] Field of Search ..... 521/72, 77, 82, 521/154

[56] References Cited

U.S. PATENT DOCUMENTS 4,888,217 12/1989 Jones ..... 521/154

FOREIGN PATENT DOCUMENTS

| | | |
|---|---|---|
| 0 291 940 A2 | 11/1988 | European Pat. Off. . |
| 291940A2 | 11/1988 | European Pat. Off. . |
| 0 355 600 A2 | 2/1989 | European Pat. Off. . |
| 355600A2 | 2/1989 | European Pat. Off. . |
| 0 314 847 A1 | 5/1989 | European Pat. Off. . |
| 314847A1 | 5/1989 | European Pat. Off. . |
| 0 365 934 A2 | 5/1990 | European Pat. Off. . |
| 365934A2 | 5/1990 | European Pat. Off. . |
| 0 416 229 A2 | 3/1991 | European Pat. Off. . |
| 416229A2 | 3/1991 | European Pat. Off. . |
| 0 462 032 A1 | 6/1991 | European Pat. Off. . |
| 462032A1 | 6/1991 | European Pat. Off. . |
| 0 440 138 A2 | 8/1991 | European Pat. Off. . |
| 440138A2 | 8/1991 | European Pat. Off. . |
| 0 495 566 A2 | 7/1992 | European Pat. Off. . |
| 495566A2 | 7/1992 | European Pat. Off. . |
| 2 575 086 | 6/1986 | France . |
| 2575086 | 6/1986 | France . |
| 34 00 309 A1 | 8/1985 | Germany . |
| 3400309A1 | 8/1985 | Germany . |
| 37 42 006 A1 | 6/1988 | Germany . |
| 3742006A1 | 6/1988 | Germany . |

OTHER PUBLICATIONS

CA 105(14):116363m CA, Abstract of JP61078866 A Date Unknown.

79–86639B, PCT/JPO, Abstract of JP54134774 Date Unknown.

79–86639B(48) Derwent, Abstract of JP54134774, Date Unknown.

G. Steinbichler et al, "Spritzgieben von Flüssigsiliconkautschuk", Kunststoffee vol. 81(1991) 7, pp. 579–581.

L. Merkt, Loiburg, "Spritzgieben von Flüssigsiliconkautschuk", Kunststoffee vol. 81(1991) 7, pp. 579–581.

"Verarbeitung von Festem und Flüssigem Siliconkautschuk", GAK Jahrgang 40, (Sep. 1987), pp. 506–508.

Advertisement Brochure of Argurg Maschinenfabrik Heal & Söhne, Mar. 1984.

G. Steinbichler et al, "Spritzgiessen von Flüssigsiliconkautschuk", *Kunststoffe* vol. 77 (1987); pp. 931–935.

*Primary Examiner*—Morton Foelak
*Attorney, Agent, or Firm*—Vidas, Arrett & Steinkraus

[57] ABSTRACT

A process for producing a high quality silicone foam by free foaming, in which a two-component addition crosslinking system is used, comprised of a component A which contains a silicone polymer having at least two double bonds per molecule, preferably vinyl groups, a complexed organoplatinum for example with butanol, fumed silica, and water, as well as further additives, if appropriate, and a component B which contains a silicone polymer having at least two double bonds per molecule, preferably vinyl groups, fumed silica, and polydimethyl hydrogen siloxane as SiH crosslinking; agent. The two components A and B are mixed, and the reaction mixture is subsequently pressurized, preferably using compressed air or nitrogen, in a storage vessel over several hours so that the gas is present in the mixture in a dissolved form. Subsequently, the reaction mixture is heated and made to react, preferably by applying it over an area and with a desired thickness, which results in the formation of a fine pored homogenous silicone foam.

18 Claims, No Drawings

PROCESS FOR PRODUCING A FINE PORED SILICONE FOAM

Matter enclosed in heavy brackets [ ] appears in the original patent but forms no part of this reissue specification; matter printed in italics indicates the additions made by reissue.

BACKGROUND OF THE INVENTION

The invention relates to a process for producing a fine pored silicone foam by free foaming the two-component foam reaction mixture in which the reaction component A, a silicone composition, contains a silicone polymer having at least two double bonds per molecule, preferably vinyl groups, an organo-platinum catalyst, fumed silica, water, and if appropriate, further additives (alone or in combination) such as color pigments, foam regulators flame retardants, fillers and the like. The crosslinking component B is polydimethyl hydrogen siloxane. Compared to other known foams, such as polyurethane foam, PVC foam, or chloroprene foam, silicone foams exhibits a number of favorable properties which make a wide application range of these foams possible. These properties include above all: UV resistance, resistance to salt water, physiological harmlessness, odor free, high comfort of wear, when used as or in items of clothing chemical resistance, resistance to aging, tightness with respect to fluids, breathability or gas permeability, low combustibility and low foam density.

EP 0 416 229 A2 discloses a process for producing a fine pored, soft-elastic, sealing foam for lid, casing and cavity seals, in which the reaction components of the foam are processed in a low pressure, two-component meter mixing machine and made to foam in a free rise process without the addition of heat. One reaction component contains a silicone polymer having at least two double bonds in the molecules, preferably vinyl groups, and an organo-platinum catalyst, as well as further additives, if appropriate, The other component is formed from hydrogen siloxane as the crosslinking agent. A small amount of water being added to component A as an additional crosslinking agents and as a blowing agent. The addition of water causes the hydrogen siloxane to react almost completely during the foaming of the silicone composition so that a highly hydrogen blowing effect is obtained. A post reaction, having detrimental effects on the quality of the silicone foam is avoided.

SUMMARY OF THE INVENTION

The invention is based on silicone polymers in which water is used as a blowing agent and hydrogen siloxane is used as a crosslinking agent. It is the objective of the invention to produce a high quality fine pored, competitively priced foam, preferably in the form of foam sheets, finding a wide range of applications, with prolonged pot life and process time (modified LSR quality) which are easily controlled in a production environment.

According to the invention, this objective is accomplished by the following features of the process:

component A of the composition contains a complexed organo-platinum catalyst, for example with butanol, whereas cross-linking agent component B contains silicone polymers having at least two double bonds per molecule, preferably vinyl groups, as well as fumed silica;

the reaction mixture is pressurized in a storage vessel for dissolving, a gas into the reaction mixture before it is withdrawn from the storage vessels; and the mixture is heated to a temperature of 150°–220° C. to generate the foam.

DETAILED DESCRIPTION OF THE INVENTION

In the process according to the invention components A and B are preferably used in the following compositions:

Component A 100 g of a silicone polymer having at least two double bonds per molecule, preferably vinyl groups, 0.2–5 g of a complex organo-platinum catalyst, 5–40 g of fumed silica, 0.05–5 g of water, and if appropriate, further additives (alone or in combination) such as color pigments (e.g., carbon black, iron oxide red), foam regulators (e.g., fluorotensides), flame retardants, fillers (e.g., quartz powder), etc.

Component B 100 g of silicone polymer having at least two double bonds per molecule, preferably vinyl groups;

5–40 g of fumed silica, and

3–20 g of a SiH functional polyorganosiloxane crosslinking agent.

The above-mentioned components A and B can be processed at a ratio of 1:1 and, at this mixing ratio, have a pot life of at least three days at 20° C. The viscosity of the two components is approximately 100,000 mPa.s.

For both components A and B, fluorosilicone polymers used as the silicone polymer may be advantageous.

In the process according to the invention, the high viscosity silicone composition is processed at a viscosity range of 30,000 to 500,000 mPa.s, whereby a high quality silicone foam is obtained which is capable of withstanding mechanical stresses Use of the complexed organo-platinum catalyst prevents premature foaming of the reaction mixture, thus making it possible to store the reaction mixture or to pressurize the reaction mixture over a prolonged period of time, which would be at least two hours, but can generally be longer, depending on the pressures used. In general, it is advisable to pressurize the mixture of the two components A and B with a pressure of at least 70–145 psi.

The reaction mixture which has been pressurized over a period of several hours contains the gas finely dispersed in a dissolved form so that it can act to nucleate the foam in the subsequent foaming reaction. For reasons of cost alone, compressed air or compressed nitrogen is preferable as the pressurizing gas, although other gases, such as inert gases, can be used as well. If the dissolved gas was not introduced into the reaction mixture, no foaming reaction producing the desired fine pored foam would result The reaction mixture into which the dissolved gas has been introduced is made to foam when applied over an area. In doing so, heating the reaction mixture as required for the foaming process can be accomplished by passing the reaction mixture through a continuous heating furnace or the like.

The two above-referenced components A and B are preferably produced such that they are free of air bubbles. Before being pressurized, it is preferable to mix so that no air bubbles are entrained in the mixture. This can be done by static mixing in the absence of air, e.g., when passing through a mixing pipe or mixing screw. If air bubbles are contained in the silicone composition, e.g., by simple stirring of the two components A and B in an open mixing vessel, then a coarse celled silicone foam is obtained which is unsuitable for the various application purposes. When dissolved air or any other gas is taken up in the reaction mixture in the absence of air bubbles, it is guaranteed that a high quality silicone foam is formed which has a high number of fine cells and is very homogenous.

If the reaction mixture made from the two components does contain entrained air bubbles, it is advisable to deaereate the mixture by means of a vacuum treatment prior to pressurizing.

The reaction mixture, which is now free of entrained air bubbles but mixed with the dissolved gas, is applied over an area with the desired coating thickness by a doctor blade or spread coating process. The mixture is heated, e.g., in a continuous heating oven, to a temperature of 150°–220° C. Depending on the thickness of the reaction mixture layer and the nature of the basic body supporting it, the foaming and curing reactions occur within 0.5 to 5 minutes. Since hydrogen is released by a chemical reaction taking place during the foaming process, it is advisable to use a continuous dryer or continuous furnace with regulated circulating of fresh air which can be controlled by hydrogen detectors. The reaction mixture can also be applied onto a base, such as a metal sheet, a metal foil (e.g., an aluminum foil), or a tissue band such as a PTFE tissue band, and made to foam. An adhesion promotor (silane adhesion promotor) can be used, if appropriate, in order to obtain strong bonding of the silicone foam to the base. The silicone foam can also be processed into a foam sheet, which can be suitably wound into a roll with a separating film being inserted in between. The common thickness of the silicone foam layers are 2–30 mm. The raw density of the silicone foam is generally 0.2–0.8 g/cm$^3$. From the silicone foam produced in the process according to the invention, wound into a roll or cut into blocks, high quality seals can be produced. Heat shields can be produced by lining with aluminum foil, or fittings can be produced for the interior items of clothing, in particular for surfing or diving suits, by lining with flexible tissue. Otherwise, the silicone foam produced in the process according to the invention can be used for many other purposes due to its high foam quality and its low cost production process. It is also possible to line both sides of the silicone foam or silicone foam sheets produced in the process according to the invention.

What is claimed is:

1. A process for producing a fine pored silicone foam by free foaming a two-component mixture of a reaction component A and a crosslinking component B, wherein:

reaction component A, a silicone composition, contains a silicone polymer having at least two double bonds per molecule, a complexed organo-platinum catalyst, fumed silica, and water;

reaction component B, a crosslinking component, contains a polydimethyl hydrogen siloxane crosslinking agent, and additionally contains a silicone polymer having at least two double bonds per molecule, and fumed silica; and, the process includes the steps of:

pressurizing the reaction mixture to a pressure of about 70 psi or greater in a storage vessel for dissolving a gas into the reaction mixture before it is withdrawn from the storage vessel; and foaming the mixture by heating to a temperature of 150°–220° C.

2. The process as recited in claim 1, wherein the ingredients of the components A and B are present in the following relative amounts:

Component A:

100 parts by weight of the silicone polymer having at least two double bonds per molecule, 0.2–5 parts by weight of the complexed organo-platinum catalyst, 5–40 parts by weight of fumed silica, 0.05–5 parts by weight of water, Component B:

100 parts by weight of a silicone polymer having at least two double bonds per molecule, 5–40 parts by weight of fumed silica, and 3–20 parts by weight of polydimethyl hydrogen siloxane crosslinking agent, and in which components A and B are mixed at a mixing ratio of 1:1 and pressurized.

3. The process as recited in claim 1 wherein the reaction mixture withdrawn from the pressure-tight storage vessel is applied over an area and made to foam by heating.

4. The process as recited in claim 1 wherein compressed air or nitrogen is used as the pressurizing gas.

5. The process as recited in claim 1 wherein the reaction mixture is heated while passing through a continuous heating furnace or the like.

6. The process as recited in claim 1 wherein pressurizing continues over a period of at least two hours and at a gas pressure of at least 145 psi.

7. The process as recited in claim 1 wherein a fluorosilicone polymer is used as the silicone polymer for the two components A and B.

8. The process as recited in claim 1 wherein the two components A and B are used free of air bubbles.

9. The process as recited in claim 1 wherein the two components A and B are mixed in the absence of air.

10. The process of claim 9 wherein the two components A and B are mixed in a mixing pipe or a mixing screw.

11. The process of claim I wherein the mixture of the two components A and B is deaereated by vacuum treatment prior to pressurization.

12. The process as recited in claim 1 wherein the reaction mixture is made to foam on a sheet base.

13. The process as in claim 12 wherein the sheet is a metal foil or a tissue band.

14. The process of claim 12 wherein an adhesion promotor is employed to promote bonding of the foam to the sheet base.

15. The process of claim 1 wherein the double bonds of at least one of the silicone polymers containing double bonds in components A and B are vinyl groups.

16. The process of claim 1 wherein the complexed organo-platinium catalyst is complexed with butanol.

17. The process of claim 1 wherein component A further comprises at least one additive selected from the group consisting of color pigments, foam regulators, flame retardants, and fillers.

18. A process for producing fine pored silicone foam comprising:

mixing a composition comprising a silicone polymer having at least two double bonds per molecule, a SiH containing crosslinker compound, a platinium based catalyst and water, pressurizing the mixture to a pressure of at least 70 psi or greater in a storage vessel for dissolving a gas into the reaction mixture, withdrawing the mixture from the storage vessel, and foaming the withdrawn mixture by heating to a temperature of 150°–220° C.

* * * * *